US011890871B2

(12) United States Patent
Li et al.

(10) Patent No.: US 11,890,871 B2
(45) Date of Patent: Feb. 6, 2024

(54) METHOD OF DRIVING INKJET HEAD, AND INKJET RECORDING DEVICE

(71) Applicant: Konica Minolta, Inc., Tokyo (JP)

(72) Inventors: Xinze Li, Toyohashi (JP); Yasuhiko Suetomi, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 73 days.

(21) Appl. No.: 17/435,227

(22) PCT Filed: Mar. 29, 2019

(86) PCT No.: PCT/JP2019/013975
§ 371 (c)(1),
(2) Date: Aug. 31, 2021

(87) PCT Pub. No.: WO2020/202245
PCT Pub. Date: Oct. 8, 2020

(65) Prior Publication Data
US 2022/0134739 A1 May 5, 2022

(51) Int. Cl.
*B41J 2/045* (2006.01)
*B41J 2/14* (2006.01)

(52) U.S. Cl.
CPC ......... *B41J 2/0459* (2013.01); *B41J 2/04581* (2013.01); *B41J 2/04588* (2013.01); *B41J 2/14209* (2013.01); *B41J 2202/06* (2013.01)

(58) Field of Classification Search
CPC .................................................... B41J 2202/06
See application file for complete search history.

(56) References Cited

U.S. PATENT DOCUMENTS

2005/0068353 A1* 3/2005 Nishiwaki ............ B41J 2/04588 347/9
2005/0200640 A1 9/2005 Hasenbein et al.
(Continued)

FOREIGN PATENT DOCUMENTS

EP 0788882 A2 8/1997
JP 2007529348 A 10/2007
(Continued)

OTHER PUBLICATIONS

CNIPA The First Office Action for corresponding CN Application No. 201980093914.8; dated Jun. 23, 2022.
(Continued)

*Primary Examiner* — Shelby L Fidler
(74) *Attorney, Agent, or Firm* — CANTOR COLBURN LLP

(57) ABSTRACT

A method of driving an inkjet head having a nozzle and a pressure generator, a plurality of droplets of the ink discharged in response to a series of the drive signals being caused to hit a recording medium to form a single pixel. The method includes, applying, to the pressure generator, the series of the drive signals including a first one of the drive signals that has a first voltage amplitude and a second one of the drive signals that has a second voltage amplitude larger than the first voltage amplitude. A last drive signal in the series of the drive signals is the second one of the drive signals. The first voltage amplitude and the second voltage amplitude are determined such that a ratio of (first voltage amplitude)/(second voltage amplitude) has a value corresponding to a specific gravity of the ink to be discharged.

16 Claims, 7 Drawing Sheets

(56) References Cited

U.S. PATENT DOCUMENTS

| | | | | |
|---|---|---|---|---|
| 2005/0270318 | A1 * | 12/2005 | Noda | B41J 2/0459 347/10 |
| 2008/0150983 | A1 | 6/2008 | Sasaki | |
| 2013/0135397 | A1 * | 5/2013 | Nishimura | B41J 2/04525 347/57 |
| 2013/0215172 | A1 * | 8/2013 | Kaneko | B41J 2/04588 347/10 |
| 2015/0072458 | A1 * | 3/2015 | Goto | B41J 2/04581 438/46 |
| 2018/0290445 | A1 | 10/2018 | Misawa et al. | |

FOREIGN PATENT DOCUMENTS

| | | | |
|---|---|---|---|
| JP | 2017202588 | A | 11/2017 |
| JP | 2018176457 | A | 11/2018 |
| WO | 2005089324 | A2 | 9/2005 |

OTHER PUBLICATIONS

International Preliminary Report on Patentability with Written Opinion of the International Searching Authority for International Application No. PCT/JP2019/013975;dated Sep. 28, 2021.
JPO Notice of Reasons for Refusal for corresponding JP Applicaiton No. 2021-510589; dated Jan. 31, 2023.
International Search Report for corresponding International Application No. PCT/JP2019/013975; dated Jun. 11, 2019.
EPO Extended European Search Report for corresponding EP Application No. 19923555.7; dated Feb. 10, 2022.
CNIPA Second Office Action for corresponding CN Application No. 201980093914.8; dated Mar. 26, 2023.

* cited by examiner

FIG.9A
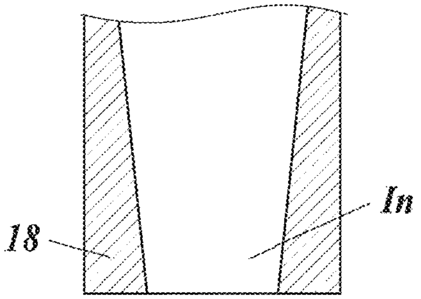
FIG.9B
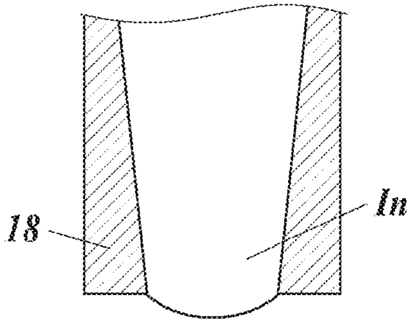
FIG.10
| | DRIVE SIGNAL A | | DRIVE SIGNAL B | | STABILITY | STABLE SPEED UPPER LIMIT (m/s) | VOLTAGE (V) |
|---|---|---|---|---|---|---|---|
| | PWa | SDPa | PWb | SDPb | | | |
| EXAMPLE 1 | 0.8AL | 2AL | AL | 2AL | CC | 6.2 | 22.8 |
| EXAMPLE 2 | AL | | | | BB | 7.1 | 23.8 |
| EXAMPLE 3 | 1.2AL | | | | AA | 7.4 | 24.9 |
| EXAMPLE 4 | 1.4AL | | | | AA | 8.2 | 24.9 |
| EXAMPLE 5 | 1.5AL | | | | CC | 6.4 | 24.9 |
| EXAMPLE 6 | AL | 1.8AL | AL | 2AL | CC | 6.0 | 21.7 |
| EXAMPLE 7 | | 2AL | | | BB | 7.1 | 23.8 |
| EXAMPLE 8 | | 2.2AL | | | AA | 7.3 | 24.9 |
| EXAMPLE 9 | | 2.4AL | | | CC | 5.8 | 22.0 |

METHOD OF DRIVING INKJET HEAD, AND INKJET RECORDING DEVICE

CROSS REFERENCE TO RELATED APPLICATIONS

This is the U.S. national stage of application No. PCT/JP2019/013975, filed on Mar. 29, 2019; the entire contents of which are incorporated herein by reference.

TECHNOLOGICAL FIELD

The present invention relates to a method of driving an inkjet head, and an inkjet recording device.

BACKGROUND ART

A conventional inkjet recording device causes ink to be discharged from a nozzle provided for an inkjet head to hit a desired position, thereby forming an image. The inkjet head is provided with a pressure chamber that communicates with the nozzle, and a pressure generator (a piezoelectric element, for example) that provides a pressure change for ink in the pressure chamber in response to application of a drive signal. The pressure generator generates a pressure change in the ink in the pressure chamber, so that the ink is discharged from the nozzle.

With some technologies, an inkjet recording device applies a series of drive signals to the pressure generator, and merges a plurality of droplets of ink, discharged from the nozzle in response to application of the series of drive signals, so as to hit a recording medium, thereby forming a single pixel (for example, Patent Document 1 and Patent Document 2). These technologies allow the hitting amount of droplets of ink to be adjusted by changing the number of drive signals to be applied.

PRIOR ART DOCUMENT

Patent Document

Patent Document 1: JP 2017-202588 A
Patent Document 2: JP 2018-176457 A

SUMMARY OF THE INVENTION

Problems to be Solved by the Invention

However, the amount of droplets of ink discharged from the nozzle and the speed of droplets of discharged ink may vary depending on a behavior of ink in the nozzle. The behavior of ink in the nozzle typically differs in correspondence to properties (for example, specific gravity and viscosity) of ink. Thus, uniform utilization and application of an identical drive signal to ink having various properties may cause the amount of droplets of discharged ink and the speed of the droplets of discharged ink to deviate from desired values. This results in a problem that a plurality of droplets of ink, discharged in response to a series of drive signals, are not merged appropriately, and a hitting position on the recording medium deviates from a desired position, leading to reduction in image quality.

The present invention has an object to provide a method of driving an inkjet head, and an inkjet recording device, which effectively prevent reduction in image quality.

Means for Solving Problems

In order to achieve the above object, an invention of a driving method as recited in claim 1 is a method of driving an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel. The method includes applying the series of the drive signals to the pressure generator, the series of the drive signals including a first one of the drive signals that has a first voltage amplitude and a second one of the drive signals that has a second voltage amplitude larger than the first voltage amplitude. A last drive signal in the series of the drive signals is the second one of the drive signals. The first voltage amplitude and the second voltage amplitude are determined such that a ratio Va/Vb has a value corresponding to a specific gravity of the ink to be discharged from the nozzle, where Va indicates the first voltage amplitude, and Vb indicates the second voltage amplitude.

According to an invention as recited in claim 2, in the driving method as recited in claim 1, the first voltage amplitude and the second voltage amplitude are determined such that the ratio Va/Vb decreases as the specific gravity of the ink to be discharged from the nozzle increases.

According to an invention as recited in claim 3, in the driving method as recited in claim 1 or 2, the first voltage amplitude and the second voltage amplitude are determined so as to satisfy $0.75<Va/Vb<0.86$ in a case where the specific gravity of the ink to be discharged from the nozzle is more than or equal to 1.0 $g/cm^3$ and less than or equal to 1.9 $g/cm^3$.

According to an invention as recited in claim 4, in the driving method as recited in claim 3, the first voltage amplitude and the second voltage amplitude are determined so as to satisfy $0.76<Va/Vb<0.80$ in a case where the specific gravity of the ink to be discharged from the nozzle is more than or equal to 1.2 $g/cm^3$ and less than or equal to 1.4 $g/cm^3$.

In order to achieve the above object, an invention of a driving method as recited in claim 5 is a method of driving an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel. The method includes applying the series of the drive signals to the pressure generator, the series of the drive signals including a first one of the drive signals that has a first voltage amplitude and a second one of the drive signals that has a second voltage amplitude larger than the first voltage amplitude. A last drive signal in the series of the drive signals is the second one of the drive signals. The first voltage amplitude and the second voltage amplitude are determined such that a ratio Va/Vb has a value corresponding to a viscosity of the ink to be discharged from the nozzle, where Va indicates the first voltage amplitude, and Vb indicates the second voltage amplitude.

According to an invention as recited in claim 6, in the driving method as recited in claim 5, the first voltage amplitude and the second voltage amplitude are determined such that the ratio Va/Vb decreases as the viscosity of the ink to be discharged from the nozzle decreases.

According to an invention as recited in claim 7, in the driving method as recited in claim 5 or 6, the first voltage amplitude and the second voltage amplitude are determined so as to satisfy 0.60<Va/Vb<0.91 in a case where the viscosity of the ink to be discharged from the nozzle is more than or equal to 8 cP and less than or equal to 16 cP.

According to an invention as recited in claim 8, in the driving method as recited in claim 7, the first voltage amplitude and the second voltage amplitude are determined so as to satisfy 0.74<Va/Vb<0.84 in a case where the viscosity of the ink to be discharged from the nozzle is more than or equal to 10 cP and less than or equal to 14 cP.

According to an invention as recited in claim 9, in the driving method as recited in any one of claims 1 to 8, the drive signals include an expansion pulse signal that expands the pressure chamber and a contraction pulse signal to be applied subsequent to the expansion pulse signal to contract the pressure chamber, and a pulse width of the expansion pulse signal in the first one of the drive signals is more than or equal to AL and less than or equal to 1.4 AL, where AL indicates ½ of an acoustic resonance cycle of a pressure wave in the pressure chamber.

According to an invention as recited in claim 10, in the driving method as recited in claim 9, the pulse width of the expansion pulse signal in the first one of the drive signals is more than or equal to 1.2 AL and less than or equal to 1.4 AL.

According to an invention as recited in claim 11, in the driving method as recited in any one of claims 1 to 8, the drive signals include an expansion pulse signal that expands the pressure chamber and a contraction pulse signal to be applied subsequent to the expansion pulse signal to contract the pressure chamber, and the pulse width of the expansion pulse signal in the first one of the drive signals is different from ½ of an acoustic resonance cycle of a pressure wave in the pressure chamber.

According to an invention as recited in claim 12, in the driving method as recited in any one of claims 1 to 11, the series of the drive signals are applied after a waiting time of more than or equal to 4 AL elapses after application of any other one of the drive signals is terminated, where AL indicates ½ of an acoustic resonance cycle of a pressure wave in the pressure chamber.

In order to achieve the above object, an invention of an inkjet recording device as recited in claim 13 is an inkjet recording device including an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel. The inkjet recording device includes a driver that applies the series of the drive signals to the pressure generator, the series of the drive signals including a first one of the drive signals that has a first voltage amplitude and a second one of the drive signals that has a second voltage amplitude larger than the first voltage amplitude. A last drive signal in the series of the drive signals is the second one of the drive signals. The first voltage amplitude and the second voltage amplitude are determined such that a ratio Va/Vb has a value corresponding to a specific gravity of the ink to be discharged from the nozzle, where Va indicates the first voltage amplitude, and Vb indicates the second voltage amplitude.

In order to achieve the above object, an invention of an inkjet recording device as recited in claim 14 is an inkjet recording device including an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel. The inkjet recording device includes a driver that applies the series of the drive signals to the pressure generator, the series of the drive signals including a first one of the drive signals that has a first voltage amplitude and a second one of the drive signals that has a second voltage amplitude larger than the first voltage amplitude. A last drive signal in the series of the drive signals is the second one of the drive signals. The first voltage amplitude and the second voltage amplitude are determined such that a ratio Va/Vb has a value corresponding to a viscosity of the ink to be discharged from the nozzle, where Va indicates the first voltage amplitude, and Vb indicates the second voltage amplitude.

Advantageous Effects of Invention

The present invention exerts an effect of effectively preventing reduction in image quality.

BRIEF DESCRIPTION OF THE DRAWINGS

FIG. 9A is a diagram illustrating an example of the position of a meniscus after ink is discharged.

FIG. 9B is a diagram illustrating an example of the position of a meniscus after ink having a higher specific gravity or a lower viscosity is discharged.

FIG. 10 is a diagram illustrating conditions for an experiment indicating effects to be obtained by adjusting a pulse width PWa and a pulse cycle SDPa, and evaluation results.

EMBODIMENTS FOR CARRYING OUT THE INVENTION

Hereinafter, an embodiment of a method of driving an inkjet head, and an inkjet recording device according to the present invention will be described with reference to the drawings.

Figure 1:
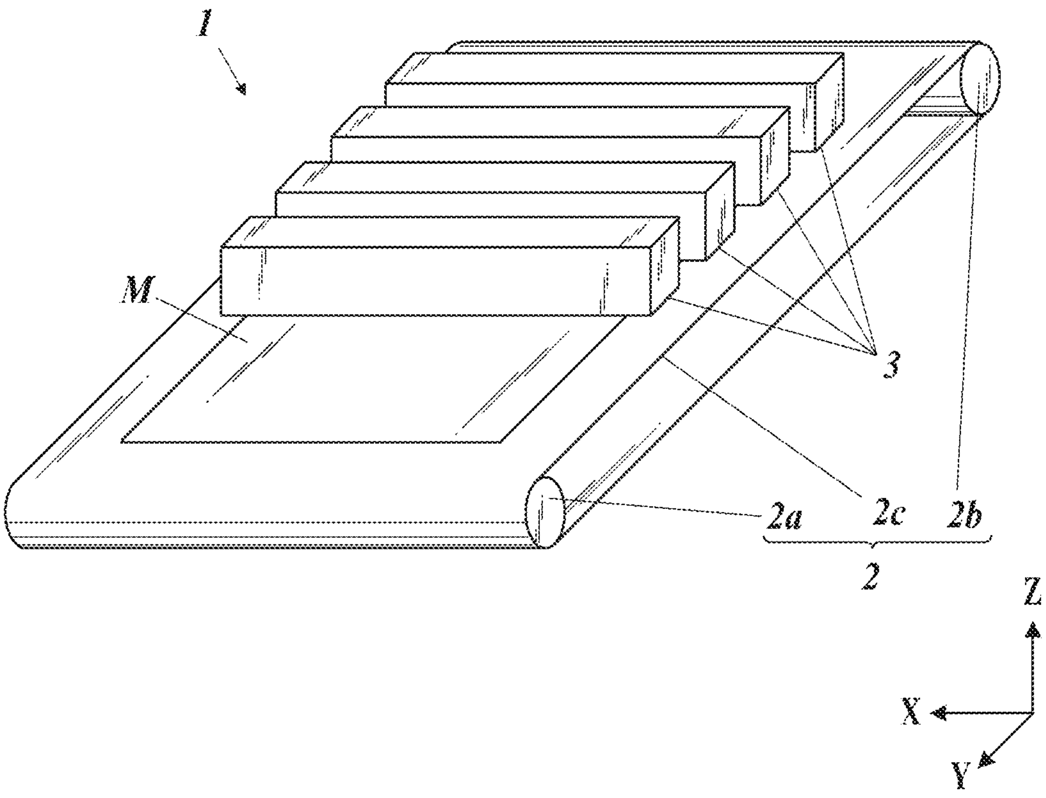
FIG. 1 is a diagram illustrating a schematic configuration of an inkjet recording device.

FIG. 1 is a diagram illustrating a schematic configuration of an inkjet recording device 1 which is an embodiment of the present invention.

The inkjet recording device 1 includes a conveyor 2, a head unit 3, and the like.

The conveyor 2 includes an annular conveyor belt 2*c* whose inner side is supported by two conveyor rollers 2*a* and 2*b* that rotate about a rotation axis extending in an X direction in FIG. 1. The conveyor roller 2*a* rotates in accordance with an operation of a conveyor motor not shown in a state where a recording medium M is placed on a conveyor surface of the conveyor belt 2*c* to cause the conveyor belt 2*c* to move in a revolving manner, so that the conveyor 2 conveys the recording medium M in a moving direction of the conveyor belt 2*c* (a conveying direction; a Y direction in FIG. 1).

The recording medium M is sheet paper cut into certain dimensions. The recording medium M is supplied onto the conveyor belt 2*c* by a sheet feeder not shown, and after ink is discharged from the head unit 3 and an image is recorded, ejected from the conveyor belt 2*c* to a predetermined paper ejector. A rolled sheet may be used as the recording medium M. Besides paper such as plain paper or coated paper, various media such as cloth or sheet-like resin that allow ink having hit the surface to be fixed are usable as the recording medium M.

The head unit 3 discharges ink to the recording medium M being conveyed by the conveyor 2 at an appropriate time based on image data, and records an image. In the inkjet recording device 1 according to the present embodiment, the four head units 3 respectively corresponding to ink of four colors, that is, yellow (Y), magenta (M), cyan (C), and black (K), are arrayed in line at predetermined intervals in the order of colors of Y, M, C, and K from an upstream side in the direction of conveying the recording medium M. The head units 3 are arranged such that ink is discharged downward in the vertical direction. The number of the head units 3 may be three or less, or five or more.

Figure 2:
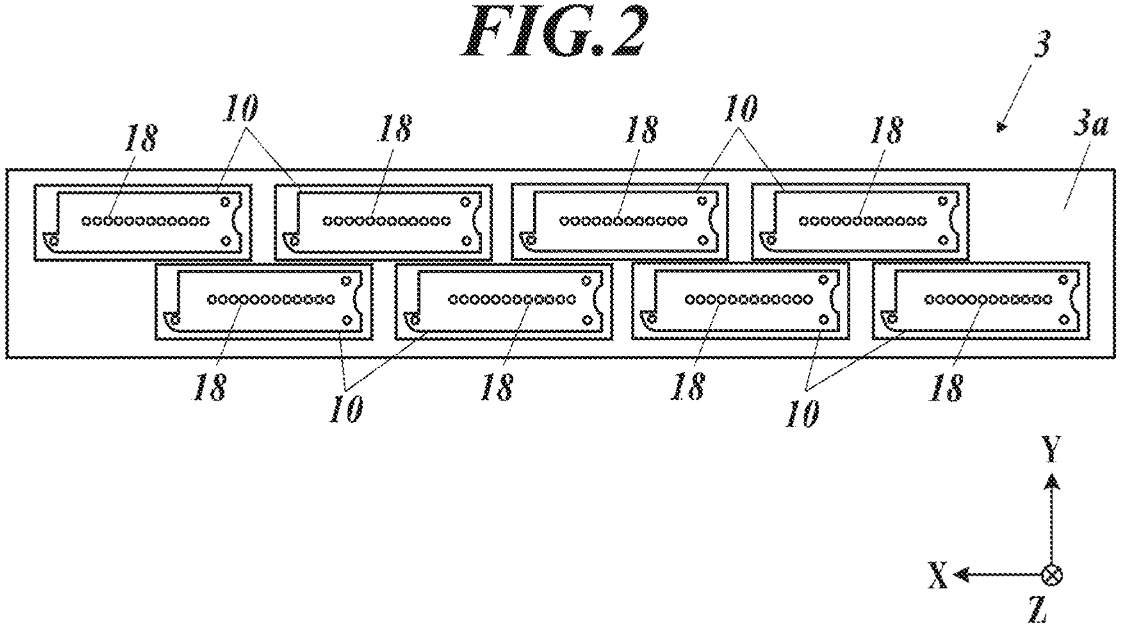
FIG. 2 is a schematic view illustrating a configuration of a head unit.

FIG. 2 is a schematic view illustrating a configuration of the head unit 3, and is a plan view of the head unit 3 as seen from the opposite side of the conveyor surface of the conveyor belt 2*c*. The head unit 3 has a plate-like base 3*a*, and a plurality of (herein, eight) inkjet heads 10 fixed to the base 3*a* in a state fitted within through-holes provided in the base 3*a*. The inkjet heads 10 are fixed to the base 3*a* in a state where a nozzle opening surface in which openings of the nozzles 18 are provided is exposed from the through-holes in the base 3*a* in a −Z direction.

In the inkjet head 10, the plurality of nozzles 18 are respectively arrayed at regular intervals in a direction that crosses the direction of conveying the recording medium M (in the present embodiment, the widthwise direction orthogonal to the conveying direction, that is, the X direction). In other words, each of the inkjet heads 10 has a row of the nozzles 18 (nozzle row) arrayed unidimensionally at regular intervals in the X direction.

The inkjet head 10 may have a plurality of nozzle rows. In this case, the plurality of nozzle rows are arranged at positions shifted from each other in the X direction such that the positions of the nozzles 18 in the X direction do not overlap.

The eight inkjet heads 10 in the head unit 3 are arranged in a staggered manner such that arrangement ranges of the nozzles 18 in the X direction are continuous. The arrangement ranges of the nozzles 18 included in the head unit 3 in the X direction cover the width in the X direction of a region of the recording medium M conveyed by the conveyor belt 2*c*, the region allowing an image to be recorded. The head units 3 are used at fixed positions when an image is recorded, and in accordance with conveyance of the recording medium M, ink is discharged from the nozzles 18 to respective positions at predetermined intervals in the conveying direction (conveying direction intervals), so that an image is recorded in a single path system.

Figure 3:
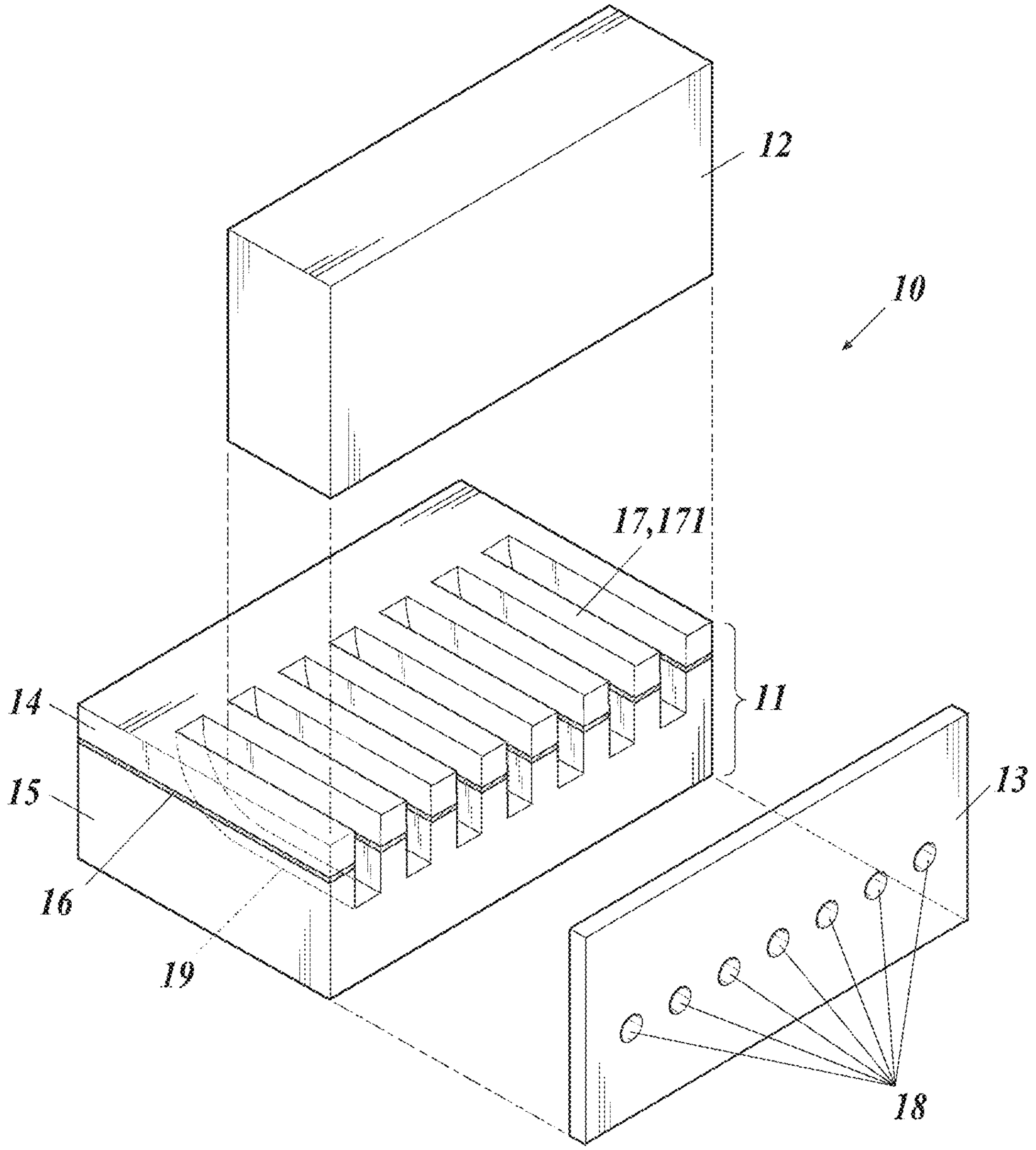
FIG. 3 is an exploded perspective view illustrating a configuration of an inkjet head.

FIG. 3 is an exploded perspective view illustrating a configuration of the inkjet head 10. Although FIG. 3 depicts a reduced number of seven nozzles 18 in the inkjet head 10, and each of the inkjet heads 10 according to the present embodiment is provided with more than or equal to several hundreds to one thousand of the nozzles 18.

The inkjet head 10 has a channel substrate 11 in which a plurality of pressure chambers 19 (channels) that communicate with the nozzles 18 are formed in correspondence to the plurality of nozzles 18. A nozzle plate 13 in which the plurality of nozzles 18 are formed are bonded to an end surface of the channel substrate 11. A cover plate 12 is attached to the upper part of the channel substrate 11 on the nozzle plate 13 side.

The channel substrate 11 has a structure obtained by bonding two substrates 14 and 15 with a joint 16 interposed therebetween. The substrates 14 and 15 are made of a piezoelectric material such as lead zirconate titanate (PZT), and are polarized in directions opposite to each other in the thickness direction. The plurality of pressure chambers 19 are formed in the channel substrate 11 in a state spaced equally from each other. Partition walls 171 (piezoelectric elements) made of a piezoelectric material are formed between the respective pressure chambers 19. An electrode 172 (see FIG. 4A) is provided on a side wall (a surface of the partition wall 171) of each of the pressure chambers 19. The partition walls 171 are bent (subjected to shear deformation) centering on the joint 16 in correspondence to a voltage applied across the electrode 172 of the adjacent pressure chamber 19. The shear deformation of the partition walls 171 in response to application of a voltage signal of a predetermined driving waveform to the electrode 172 fluctuates the pressure of ink in the pressure chamber 19, and the ink in the pressure chamber 19 is discharged from the nozzle 18 accordingly. In this manner, the electrodes 172 and the partition walls 171 constitute a pressure generator 17 (actuator) that performs a driving operation of providing a pressure change for the ink in the pressure chamber 19. The operation of this pressure generator 17 providing a pressure change for the ink in the pressure chamber 19 will be hereinafter referred to as a driving operation.

In this manner, the inkjet head 10 according to the present embodiment is an inkjet head in a shear mode, which causes ink to be discharged from the nozzles 18 with a shear stress produced by applying an electric field in a direction orthogonal to the polarized direction of the piezoelectric elements.

Figure 4A:
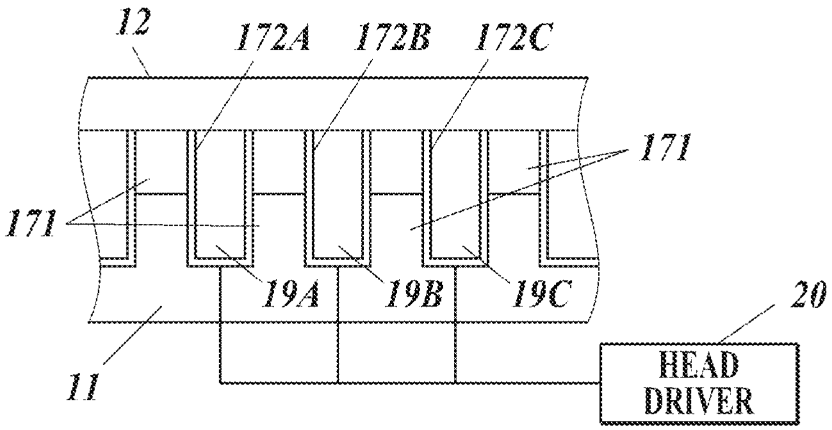
FIG. 4A is a schematic sectional view describing a driving operation of a pressure generator.
Figure 4B:
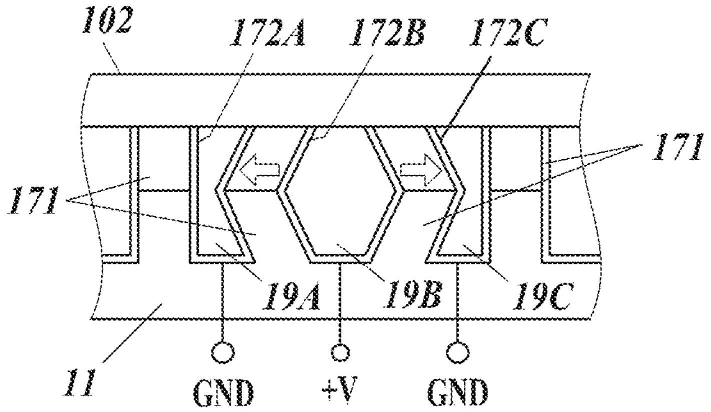
FIG. 4B is a schematic sectional view describing the driving operation of the pressure generator.
Figure 4C:
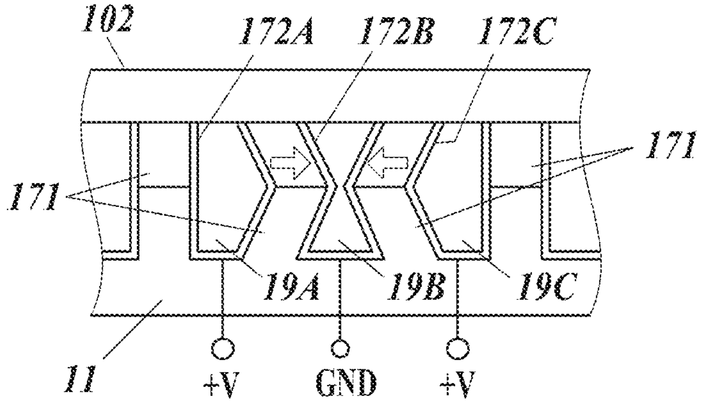
FIG. 4C is a schematic sectional view describing the driving operation of the pressure generator.

FIG. 4A to FIG. 4C are schematic sectional views describing the driving operation of the pressure generator 17.

FIG. 4A to FIG. 4C are schematic sectional views of the inkjet head 10 in a plane parallel to the nozzle plate 13. FIG. 4A to FIG. 4C depict three pressure chambers 19A to 19C adjacent to each other, and an operation in a case of causing ink to be discharged from the pressure chamber 19B located at the center among them will be described below. The electrodes 172A to 172C of the respective pressure chambers 19A to 19C are connected to a head driver 20 (see FIG. 6), and a drive signal is supplied from this head driver 20 to the electrodes 172A to 172C.

Figure 5:
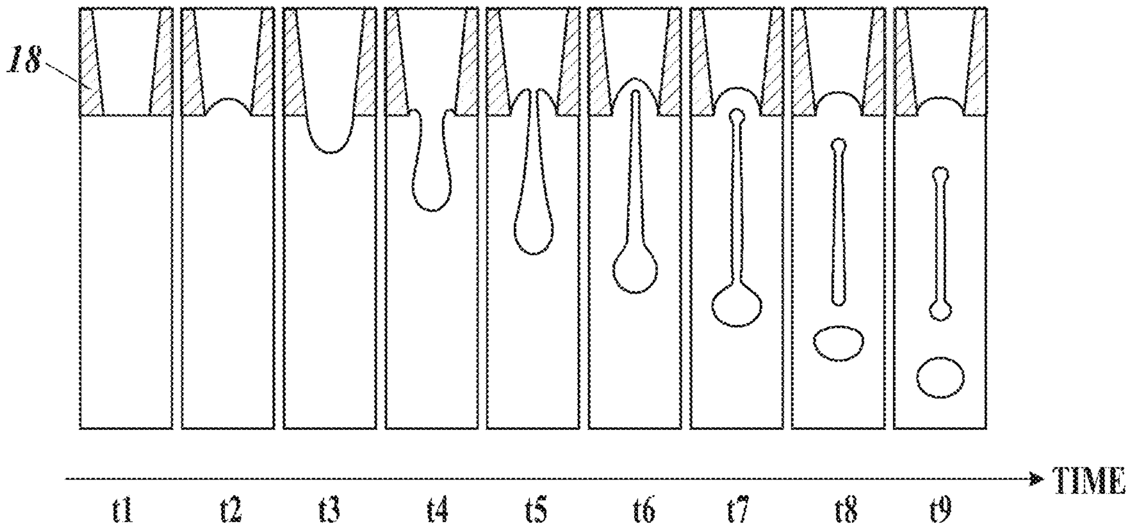
FIG. 5 is a diagram illustrating a manner in which ink is discharged from nozzles in accordance with the driving operation.

FIG. 5 is a diagram illustrating a manner in which ink is discharged from the nozzle 18 in accordance with the driving operation. FIG. 5 illustrates ink in the nozzle 18 at each of time t1 to time t9 and behaviors of discharged ink.

In the case of causing ink to be discharged from the nozzle 18 of the pressure chamber 19B, starting from a neutral state illustrated in FIG. 4A (at time t1 in FIG. 5), the electrodes 172A and 172C of the pressure chambers 19A and 19C are brought into a ground potential, and a pulse signal of a voltage +V is applied (in other words, an expansion pulse signal is applied) to the electrode 172B of the pressure chamber 19B as illustrated in FIG. 4B. This produces an electric field in the partition walls 171, and subjects the partition walls 171 to shear deformation to expand the volume of the pressure chamber 19B. This produces a negative pressure in the pressure chamber 19B, and causes ink to be flown into the pressure chamber 19B through an ink flow path connected to the pressure chamber 19B (at time t2 in FIG. 5).

As illustrated in FIG. 4C, a pulse signal of the voltage +V is applied to the electrodes 172A and 172C of the pressure chambers 19A and 19C, and the potential of the electrode 172B of the pressure chamber 19B is changed to the ground potential (in other words, a contraction pulse signal is applied). This produces an electric field in the partition walls 171, and subjects the partition walls 171 to shear deformation to contract the volume of the pressure chamber 19B. This produces a positive pressure in the pressure chamber 19B, and causes droplets of ink (hereinafter referred to as ink droplets) to be discharged from the nozzle 18 (at time t3 to time t9 in FIG. 5).

In this manner, in the inkjet head 10, the pressure generator 17 performs the driving operation of expanding the pressure chamber 19 in response to the expansion pulse signal, and then contracting the pressure chamber 19 in response to the contraction pulse signal, thereby increasing the inner pressure of the pressure chamber 19 to cause ink to be discharged from the nozzle 18. The pressure generator 17 corresponding to the pressure chamber 19B is formed by a pair of partition walls 171 adjacent to the pressure chamber 19B, and the electrodes 172A to 173C provided for the pair of partition walls 171.

Figure 6:
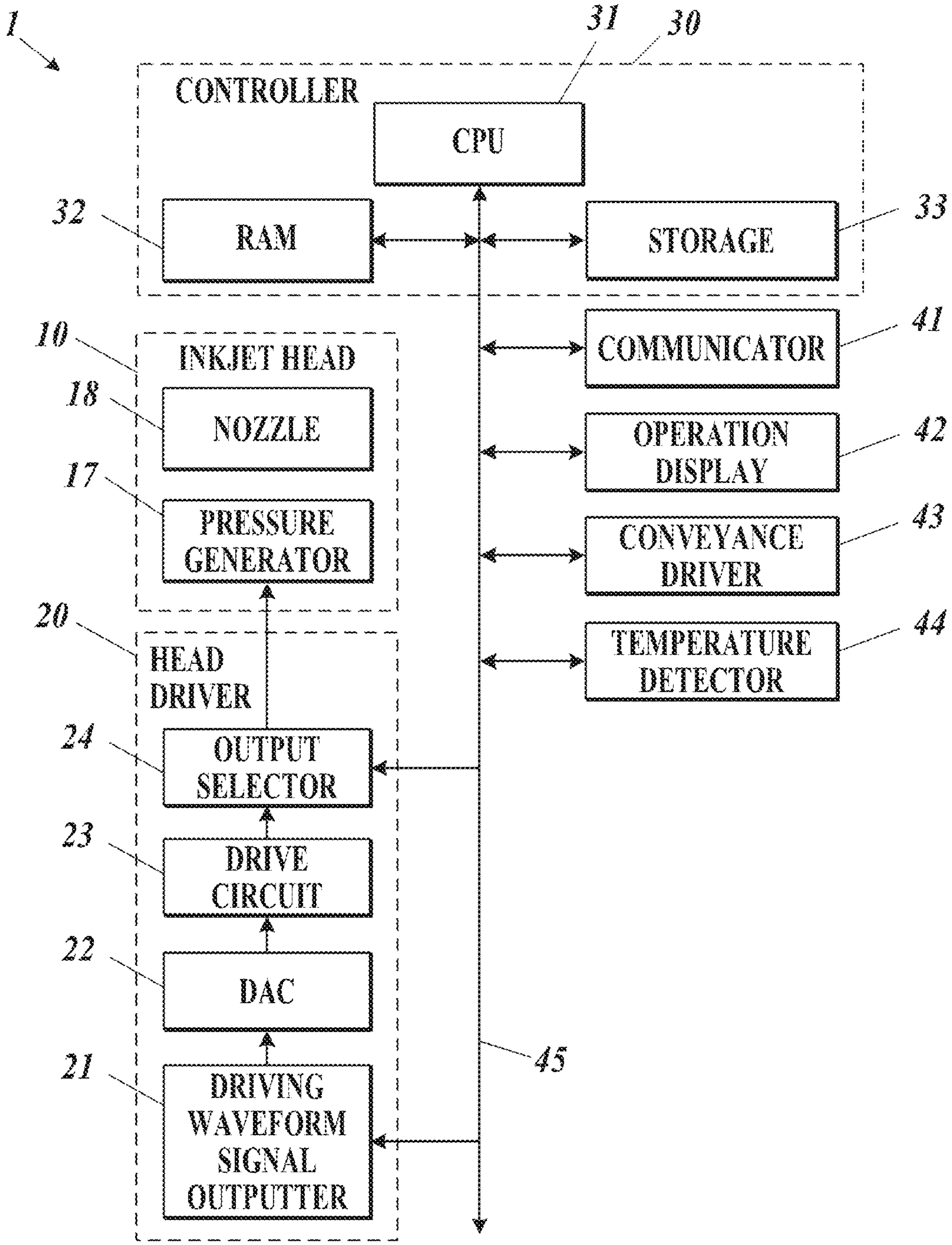
FIG. 6 is a block diagram illustrating a functional configuration of the inkjet recording device.

FIG. 6 is a block diagram illustrating a functional configuration of the inkjet recording device 1 according to the present embodiment.

The inkjet recording device 1 includes the above-described inkjet head 10, the head driver 20 (driver), a controller 30, a communicator 41, an operation display 42, a conveyance driver 43, a temperature detector 44, a bus 45, and the like.

The head driver 20 outputs (applies) the expansion pulse signal and the contraction pulse signal for causing ink to be discharged from each of the nozzles 18 of the inkjet head 10 at an appropriate time to the pressure generator 17 corresponding to a selected one of the nozzles 18, thereby operating the pressure generator 17. The head driver 20 includes a driving waveform signal outputter 21, a digital/analog converter 22 (DAC), a drive circuit 23, an output selector 24, and the like.

The driving waveform signal outputter 21 outputs digital data having a driving waveform in accordance with discharge or non-discharge of ink in synchronization with a clock signal input from an oscillation circuit not shown. The DAC 22 converts the driving waveform of this digital data into an analog signal, and outputs the analog signal to the drive circuit 23 as an input signal.

The drive circuit 23 amplifies the above-described input signal to have a voltage value corresponding to a driving voltage of the pressure generator 17, and then performs current amplification to output the input signal as a pulse signal. As will be described later, the drive circuit 23 outputs a pulse signal of a voltage Va and a voltage Vb higher than the voltage Va in correspondence to the driving waveform output from the driving waveform signal outputter 21.

The output selector 24 outputs a switching signal for selecting the pressure generator 17 to which the pulse signal is to be output in correspondence to pixel data on a to-be-formed image output from the controller 30.

The communicator 41 transmits/receives data to/from an external instrument in conformity with a predetermined communication standard. The communicator 41 includes a connection terminal for the communication standard used, a hardware (network card) of a driver for communication connection, and the like.

The operation display 42 causes status information, a menu, and the like for image recording to be displayed, and accepts an input operation made by a user. The operation display 42 includes a display screen implemented by a liquid crystal panel and a driver for the liquid crystal panel, a touch panel provided to overlap the liquid crystal screen, and the like, for example, and outputs an operation detection signal corresponding to the position where the user makes a touch operation and the type of the operation to the controller 30.

The conveyance driver 43 acquires the recording medium M before image recording from a medium supplier, arranges the recording medium M with an appropriate position facing an ink discharge surface of the inkjet head 10, and causes the recording medium M on which an image has been recorded to be ejected from the position facing the ink discharge surface. The conveyance driver 43 rotatably operates a motor that rotates the conveyor roller 2*a* at appropriate speed and time.

The temperature detector 44 is attached to the inkjet head 10, or provided in the vicinity of the inkjet head 10, detects the temperature, and outputs a detection result to the controller 30.

The controller 30 is a processor that integrally controls the overall operation of the inkjet recording device 1. The controller 30 includes a CPU 31 (Central Processing Unit), a RAM 32 (Random Access Memory), a storage 33, and the like. The CPU 31 performs various types of arithmetic processing for the integral control exerted by the inkjet recording device 1. The RAM 32 provides the CPU 31 with a working memory space, and stores temporary data. The storage 33 stores control programs to be executed by the CPU 31, configuration data, and the like, and temporarily stores data on a to-be-formed image. The storage 33 includes a volatile memory such as a DRAM and a nonvolatile storage medium such as a HDD (Hard Disk Drive) or flash memory, which are used separately depending on the application.

The bus 45 is a communication path that connects these components to transmit/receive data.

A method of driving the inkjet head 10 in the inkjet recording device 1 according to the present embodiment, and an ink discharge operation corresponding to the driving method will be described.

As illustrated in FIG. 4A to FIG. 4C, the inkjet recording device 1 expands the pressure chamber 19 in response to the expansion pulse signal, and then contracts the pressure chamber 19 in response to the contraction pulse signal, so that droplets of ink are discharged from the nozzle 18. A signal including this expansion pulse signal and the contraction pulse signal constitutes a drive signal.

In the inkjet recording device 1 according to the present embodiment, a sequential driving operation in response to application of a series of two or more drive signals causes a plurality of ink droplets to be discharged from the nozzle 18. The plurality of ink droplets are merged and hit a single pixel range on the recording medium M to form a single pixel. By changing the number of ink droplets to be merged, the concentration (gradation) of pixels is expressed. The plurality of ink droplets before being merged may be in a state connected with columnar ink (an ink liquid column), or may be in a state separated from each other.

Hereinafter, the series of drive signals for discharging ink droplets to be merged will also be referred to as a composite drive signal for the sake of convenience.

Figure 7:
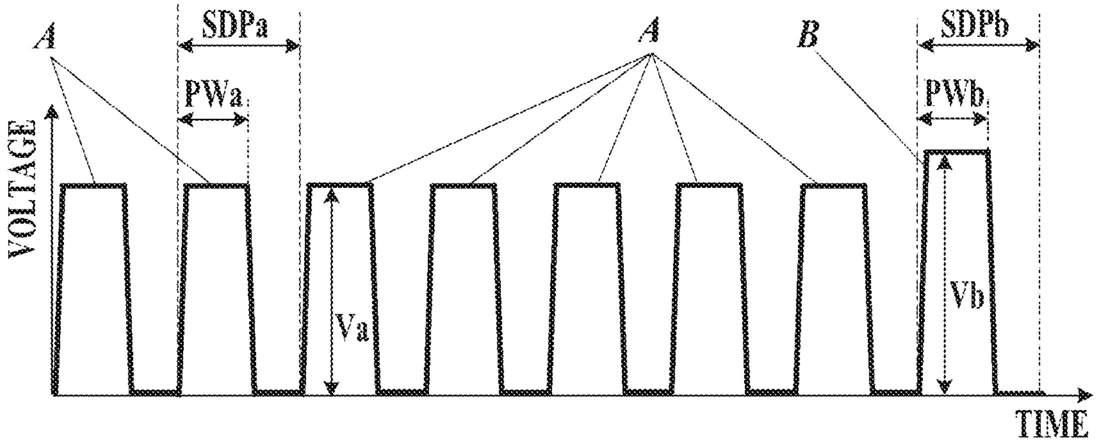
FIG. 7 is a diagram illustrating an example of a composite drive signal.

FIG. 7 is a diagram illustrating an example of a composite drive signal.

The composite drive signal in FIG. 7 represents a series of drive signals to be applied to the electrode 172 of the pressure chamber 19 (the pressure chamber 19B in the example in FIG. 4A to FIG. 4C) that discharges ink. This composite drive signal includes seven drive signals A (first drive signal) and a single drive signal B (second drive signal) to be applied at the end subsequent to the seven drive signals A.

The drive signal A includes a pulse signal of a voltage (voltage amplitude) Va. In the drive signal A, a portion from the rising edge to the falling edge of this pulse signal corresponds to the expansion pulse signal, and a portion after the falling edge of the pulse signal corresponds to the contraction pulse signal. Among them, a voltage applying time period of the expansion pulse signal (a time period from the rising edge of the expansion pulse signal to the falling edge of the contraction pulse signal) will be hereinafter referred to as a pulse width PWa of the expansion pulse signal. The cycle of the drive signal A is a pulse cycle SDPa. The seven drive signals A are thus applied consecutively seven times for the respective pulse cycles SDPa.

The drive signal B includes a pulse signal of a voltage Vb (>Va). In the drive signal B, a portion from the rising edge to the falling edge of this pulse signal corresponds to the expansion pulse signal, and a portion after the falling edge of the pulse signal corresponds to the contraction pulse signal. Among them, a voltage applying time period of the expansion pulse signal (a time period from the rising edge of the expansion pulse signal to the falling edge of the contraction pulse signal) will be hereinafter referred to as a pulse width PWb of the expansion pulse signal. The cycle of the drive signal B is a pulse cycle SDPb.

As illustrated in FIG. 4A to FIG. 4C, a voltage is applied to the electrodes 172 of the adjacent pressure chambers 19 for a period complementary to the composite drive signal in FIG. 7, and thus, the amplitude of the voltage to be applied to the partition walls 171 when a change is made from the expansion pulse to the contraction pulse is 2Va in the drive signal A, and 2Vb in the drive signal B. The following description pays attention to a composite drive signal to be applied to the electrode 172 of the pressure chamber 19 that discharges ink.

The pulse widths PWa and PWb have a length equal to ½ of an acoustic resonance cycle of a pressure wave in the pressure chamber 19 (hereinafter referred to as AL (Acoustic Length)), for example. The pulse cycles SDPa and SDPb have a length equal to 2 AL, for example. In a case where the pulse widths PWa and PWb are AL, and the pulse cycles SDPa and SDPb are 2 AL, an in-phase pressure wave is generated in the pressure chamber 19. Thus, resonance of the pressure wave is utilized to discharge ink droplets with the highest efficiency and therefore at a high speed. However, when the pulse width PWa is shifted from AL, an effect of stabilizing a flying trajectory of ink is also obtained. This will be described later.

The composite drive signal is applied after a waiting time of more than or equal to 4 AL elapses after application of any other drive signal is terminated.

By applying such a composite drive signal to the pressure generator 17, seven ink droplets in response to the seven drive signals A and a single ink droplet in response to the single drive signal B are discharged consecutively, and merged to hit the recording medium M.

By making the voltage Vb of the last drive signal B in the composite drive signal higher than the voltage Va of the drive signal A, the speed of ink to be discharged in response to the drive signal B (ink on the tail end) is made higher than the speed of ink to be discharged in response to the drive signal A. This makes ink on the tail end easier to catch up with preceding ink, which allows ink to be merged more appropriately.

In this manner, the driving method of merging a plurality of droplets may cause a defect in which ink on the tail end fails to catch up with preceding ink depending on the ratio between the voltage Va and the voltage Vb or properties of ink, and ink is not merged appropriately. Such a defect is likely to occur particularly in a case where ink has a high specific gravity or a low viscosity. The reason will be described below with reference to FIG. 8, FIG. 9A, and FIG. 9B.

Figure 8:
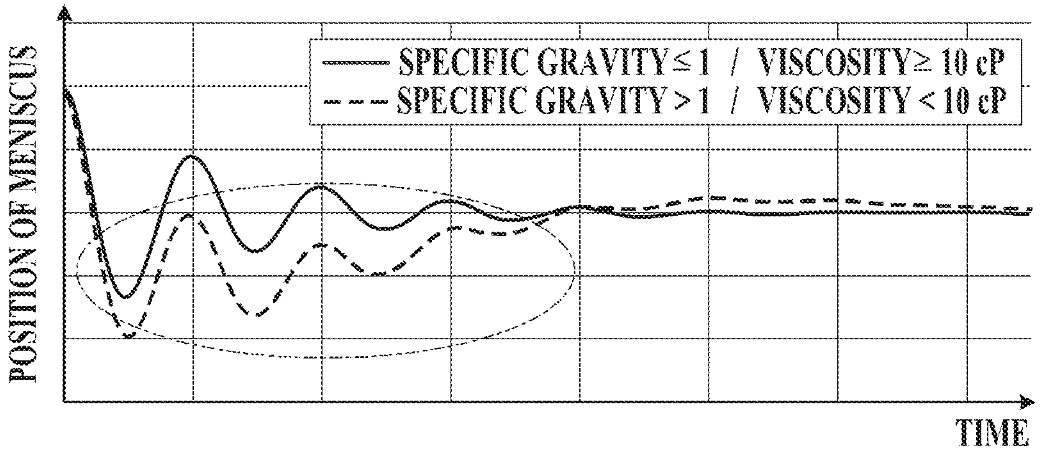
FIG. 8 is a diagram illustrating a transition of the position of a meniscus corresponding to properties of ink.

FIG. 8 is a diagram illustrating a transition of the position of a meniscus corresponding to properties of ink.

FIG. 8 illustrates a transition of position variations (fluctuations) of a meniscus of ink in the nozzle 18 immediately after a single ink droplet is discharged. As to the position of the meniscus, the lower side in the drawing corresponds to the downward side in the vertical direction. A solid line represents an example of meniscus position variations in a case where the specific gravity of ink is less than or equal to 1 and/or the viscosity of ink is more than or equal to 10 cP. A broken line represents an example of meniscus position variations in a case where the specific gravity of ink is more than 1 and/or the viscosity of ink is less than 10 cP.

In the case where ink has a high specific gravity and/or a low viscosity, the position of the meniscus in the nozzle 18 transitions at a relatively lower side in the vertical direction, and the average position of the meniscus is shifted downward, as illustrated by a portion enclosed with the broken line in FIG. 8. For example, in a case where the meniscus is located within the same plane as the nozzle opening as in FIG. 9A at a predetermined time after typical ink is discharged, the position of the meniscus at the same time in a case where ink having a higher specific gravity of ink or ink having a lower viscosity is discharged under the same conditions is in a state projecting from the nozzle opening (a state spilling out of the nozzle opening), as illustrated in FIG. 9B. When ink is discharged in the state as in FIG. 9B, the amount of ink to be discharged is larger than in a case where ink is discharged in the state in FIG. 9A, and the speed of ink decreases according to the law of the conservation of energy. This easily produces a defect in which ink on the tail end fails to catch up with preceding ink, and fails to be merged appropriately.

Thus, in the composite drive signal according to the present embodiment, the voltage Va of the drive signal A and the voltage Vb of the drive signal B are determined such that ink is merged appropriately even in the case where ink has a high specific gravity and/or ink has a low viscosity.

In voltage adjustment in correspondence to the specific gravity of ink, the voltage Va and the voltage Vb are determined such that the ratio Va/Vb has a value corresponding to the specific gravity of ink.

Describing in detail, in a case where the specific gravity of ink is more than or equal to 1.0 g/cm$^3$ and less than or equal to 1.9 g/cm$^3$, the voltage Va and the voltage Vb are determined so as to satisfy 0.75<Va/Vb<0.86. In a case where the specific gravity of ink is more than or equal to 1.2 $g/cm^3$ and less than or equal to 1.4 $g/cm^3$, the voltage Va and the voltage Vb are determined so as to satisfy 0.76<Va/Vb<0.80. The voltage Va and the voltage Vb may be determined such that the ratio Va/Vb decreases as the specific gravity of ink increases. Herein, the expression "the ratio Va/Vb decreases as the specific gravity of ink increases" indicates that the ratio Va/Vb is monotonically non-increasing as the specific gravity of ink increases. The ratio Va/Vb may be changed stepwise as the specific gravity of ink is changed.

In voltage adjustment in correspondence to the viscosity of ink, the voltage Va and the voltage Vb are determined such that the ratio Va/Vb has a value corresponding to the viscosity of ink.

Describing in detail, in a case where the viscosity of ink is more than or equal to 8 cP and less than or equal to 16 cP, the voltage Va and the voltage Vb are determined so as to satisfy 0.60<Va/Vb<0.91. In a case where the viscosity of ink is more than or equal to 10 cP and less than or equal to 14 cP, the voltage Va and the voltage Vb are determined so as to satisfy 0.74<Va/Vb<0.84. The voltage Va and the voltage Vb may be determined such that the ratio Va/Vb decreases as the viscosity of ink decreases. Herein, the expression "the ratio Va/Vb decreases as the viscosity of ink decreases" indicates that the ratio Va/Vb is monotonically non-increasing as the viscosity of ink decreases. The ratio Va/Vb may be changed stepwise as the viscosity of ink is changed.

In this manner, the voltage Vb (therefore, the voltage Va) is determined such that, upon determining the ratio Va/Vb to fall within a predetermined range in correspondence to the specific gravity or viscosity of ink, the speed of ink to be discharged is stable irrespective of the number of droplets to be discharged in response to the composite drive signal (in other words, irrespective of gradation of pixels to be recorded).

Values of the ratio Va/Vb, the voltage Va, and the voltage Vb may be set directly in accordance with an input operation on the operation display 42 made by a user, or may be set automatically based on data on the specific gravity or viscosity of ink having been input by the user inputting the type of ink to the operation display 42.

The viscosity of ink changes in correspondence to the temperature. Thus, in the case of performing voltage adjustment in correspondence to the viscosity, set values of the voltage Va and the voltage Vb may be adjusted in correspondence to a detection result of the temperature detector 44. In other words, the viscosity of ink at each temperature may be acquired in advance, and set values of the voltage Va and the voltage Vb may be adjusted such that the ratio Va/Vb falls within the above range in correspondence to the viscosity of ink at a detected temperature.

In the present embodiment, by adjusting the pulse width PWa of the expansion pulse signal in the drive signal A upon determining the voltage Va and the voltage Vb such that the ratio Va/Vb falls within the above range, the stability of discharged ink is increased, and ink is merged more appropriately. By adjusting the pulse cycle SDPa, the effect of increasing the stability of ink may also be produced.

FIG. 10 is a diagram illustrating conditions for an experiment indicating effects to be obtained by adjusting the pulse width PWa and the pulse cycle SDPa, and evaluation results.

In this experiment, ink was discharged in response to a composite drive signal including a predetermined number of two or more of the drive signals A and the single drive signal B, and the flying trajectory of discharged ink was imaged to evaluate discharge stability.

The pulse width PWa or the pulse cycle SDPa was changed in nine levels as Examples 1 to 9, and the stability was evaluated for each of the examples.

Specifically, in Examples 1 to 5, the pulse width PWa was set at 0.8 AL, AL, 1.2 AL, 1.4 AL, and 1.5 AL, respectively. In Examples 1 to 5, the pulse cycle SDPa was set at 2 AL.

In Examples 6 to 9, the pulse cycle SDPa was set at 1.8 AL, 2 AL, 2.2 AL, and 2.4 AL, respectively. In Examples 6 to 9, the pulse width PWa was set at AL.

In each of Examples 1 to 9, the pulse width PWb of the expansion pulse signal in the drive signal B was set at AL, and the pulse cycle SDPb was set at 2 AL.

The voltage Vb in each of the examples was set at a value adjusted such that the speed of ink discharged in response to the above-described composite drive signal is equal to the speed of ink discharged in response to the single drive signal B. The ratio Va/Vb in each of the examples was constant.

The stability was evaluated in three levels of "AA", "BB", and "CC".

Specifically, a case in which blurring was seen in discharged ink, that is, a case in which part of the flying trajectory of ink was deviated from an ideal trajectory was evaluated as "CC".

A case in which blurring was very slight, if seen in discharged ink, was evaluated as "BB".

A case in which blurring was not seen in discharged ink was evaluated as "AA".

For each of "AA", "BB", and "CC", ink was merged appropriately by adjusting the ratio Va/Vb.

The following will describe an evaluation result of stability in each of the examples.

First, among Examples 1 to 5 in which the pulse width PWa was changed, the evaluation result of stability was "AA" in Example 3 in which the pulse width PWa was set at 1.2 AL and in Example 4 in which the pulse width PWa was set at 1.4 AL. In Example 2 in which the pulse width PWa was set at AL, the evaluation result of stability was "BB". In Example 1 in which the pulse width PWa was set at 0.8 AL and in Example 5 in which the pulse width PWa was set at 1.5 AL, the evaluation result of stability was "CC". These results have confirmed that blurring of ink is reduced effectively by adjusting the pulse width PWa to be more than or equal to AL and less than or equal to 1.4 AL. It has been particularly confirmed that blurring of ink is reduced further by adjusting the pulse width PWa to be more than or equal to 1.2 AL and less than or equal to 1.4 AL.

Among Examples 6 to 9 in which the pulse cycle SDPa was changed, the evaluation result of stability was "AA" in Example 8 in which the pulse cycle SDPa was set at 2.2 AL. In Example 7 in which the pulse cycle SDPa was set at 2 AL, the evaluation result of stability was "BB". In Example 6 in which the pulse cycle SDPa was set at 1.8 AL, and in Example 9 in which the pulse cycle SDPa was set at 2.4 AL, the evaluation result of stability was "CC". These results have confirmed that blurring of ink is reduced effectively by adjusting the pulse cycle SDPa to be more than or equal to 2 AL and less than or equal to 2.2 AL. It has been particularly confirmed that blurring of ink is reduced further by adjusting the pulse cycle SDPa to be 2.2 AL.

Two columns on the right in the table in FIG. 10 show an upper limit value of a speed at which ink flies stably in each of the examples (stable speed upper limit) and a voltage at which the speed of ink becomes the stable speed upper limit. The stable speed upper limit is a speed at which significant blurring of ink occurs in a case of increasing the voltage Vb to increase the speed of ink. The examples in which this stable speed upper limit was higher resulted in a more favorable evaluation result of stability of ink.

An increase range of the stable speed upper limit remains at 0.2 m/s in a case of adjusting the pulse cycle SDPa from 2 LA (Example 7) to 2.2 AL (Example 8), while the stable speed upper limit is improved in a range of 1.1 m/s by adjusting the pulse width PWa from AL (Example 2) to 1.4 AL (Example 4). This proves that, by adjusting the pulse width PWa, ink is stabilized more effectively than in the case of adjusting the pulse cycle SDPa.

Examples 1 to 5 in FIG. 10 prove that it is not necessarily optimum to set the pulse width PWa at AL from the perspective of blurring of ink, and the stability of ink is increased by shifting (in particular, increasing) the pulse width PWa from AL. This is considered because the phase of the pressure wave produced in the pressure chamber 19 is shifted at each of the rising edge of the expansion pulse signal of the drive signal A and the falling edge of the contraction pulse signal. In other words, it is considered because, in an in-phase case, ink excessively spills out of the nozzle opening so that the flying trajectory of ink tends to be unstable, whereas this defect is prevented from occurring by shifting the phase.

Examples 6 to 9 prove that it is not necessarily optimum to set the pulse cycle SDPa of the drive signal A at 2 AL from the perspective of blurring of ink, and the stability of ink is increased by shifting (in particular, increasing) the pulse cycle SDPa from AL. This is considered because the phase of the pressure wave produced in the pressure chamber 19 is shifted at the rising edge of the expansion pulse signal of the drive signal A from the phase of a pressure wave occurred in the latest ink discharge, which consequently prevents ink from excessively spilling out.

As described above, the method of driving the inkjet head 10 according to the present embodiment is a method of driving the inkjet head 10 having the nozzle 18 that discharges ink and the pressure generator 17 that, in response to application of drive signals, provides pressure changes for ink in the pressure chamber 19 that communicates with the nozzle 18 to cause the ink to be discharged from the nozzle 18, a plurality of ink droplets discharged from the nozzle 18 in response to application of a series of drive signals being caused to hit the recording medium M to form a single pixel. A composite drive signal as the series of drive signals including the drive signal A in which a first voltage amplitude is the voltage Va and the drive signal B in which a second voltage amplitude is the voltage Vb higher than the voltage Va is applied to the pressure generator 17. The last drive signal in the composite drive signal is the drive signal B. The voltage Va and the voltage Vb are determined such that the ratio Va/Vb has a value corresponding to the specific gravity of the ink to be discharged from the nozzle 18.

Such a driving method allows the speed of ink droplets discharged at the end in response to the drive signal B to fly at a desired value even in a case of discharging ink having a high specific gravity that is likely to spill out of the opening of the nozzle 18 and likely to have a low discharge speed. This allows ink on the tail end to catch up with preceding ink to be merged appropriately. This effectively prevents reduction in image quality that would be caused by a failure in merging ink appropriately.

By determining the voltage Va and the voltage Vb such that the ratio Va/Vb decreases as the specific gravity of the ink to be discharged from the nozzle 18 increases, ink on the tail end is discharged with higher energy as the specific gravity of the ink increases. Thus, a defect in which the speed of ink on the tail end is insufficient is effectively prevented from occurring.

In the driving method according to the present embodiment, the voltage Va and the voltage Vb are determined so as to satisfy $0.75<Va/Vb<0.86$ in a case where the specific gravity of ink to be discharged from the nozzle 18 is more than or equal to 1.0 g/cm$^3$ and less than or equal to 1.9 g/cm$^3$.

The voltage Va and the voltage Vb are determined so as to satisfy $0.76<Va/Vb<0.80$ in a case where the specific gravity of ink to be discharged from the nozzle 18 is more than or equal to 1.2 g/cm$^3$ and less than or equal to 1.4 g/cm$^3$.

By making the ratio Va/Vb higher than the lower limit of each of the above-described ranges, reduction in merging capability that would be caused by a low speed of ink to be discharged in response to the drive signal A is prevented, while controlling the voltage Vb not to be excessively high. In other words, in a case of increasing the voltage Va while maintaining the ratio Va/Vb such that ink to be discharged in response to the drive signal A is discharged at a predetermined speed, a defect in which the voltage Vb becomes excessively high to deteriorate the pressure generator 17 is prevented from occurring.

By setting the ratio Va/Vb to be less than the upper limit of each of the above-described ranges, a defect in which ink on the tail end fails to catch up with preceding ink and fails to be merged is prevented from occurring. Therefore, by determining the voltage Va and the voltage Vb such that the ratio Va/Vb falls within the above-described ranges, ink is merged more reliably.

The method of driving the inkjet head 10 according to the present embodiment is a method of driving the inkjet head 10 having the nozzle 18 that discharges ink and the pressure generator 17 that, in response to application of drive signals, provides pressure changes for ink in the pressure chamber 19 that communicates with the nozzle 18 to cause the ink to be discharged from the nozzle 18. A plurality of ink droplets discharged from the nozzle 18 in response to application of a series of drive signals are caused to hit the recording medium M to form a single pixel. A composite drive signal as the series of drive signals including the drive signal A in which a first voltage amplitude is the voltage Va and the drive signal B in which a second voltage amplitude is the voltage Vb higher than the voltage Va is applied to the pressure generator 17. The last drive signal in the composite drive signal is the drive signal B. The voltage Va and the voltage Vb are determined such that the ratio Va/Vb has a value corresponding to the viscosity of the ink to be discharged from the nozzle 18.

Such a driving method allows ink droplets discharged at the end in response to the drive signal B to fly at a speed of a desired value even in a case of discharging low-viscosity ink that is likely to spill out of the opening of the nozzle 18, and is likely to have a low discharge speed. This allows ink on the tail end to catch up with preceding ink to be merged appropriately. This effectively prevents reduction in image quality that would be caused by a failure in merging ink appropriately.

Since the voltage Va and the voltage Vb are determined such that the ratio Va/Vb decreases as the viscosity of ink to be discharged from the nozzle 18 decreases, ink on the tail end is discharged with higher energy as the viscosity of ink decreases. Thus, a defect in which the speed of ink on the tail end is insufficient is effectively prevented from occurring.

In the driving method according to the present embodiment, the voltage Va and the voltage Vb are determined so as to satisfy 0.60<Va/Vb<0.91 in a case where the viscosity of ink to be discharged from the nozzle 18 is more than or equal to 8 cP and less than or equal to 16 cP.

The voltage Va and the voltage Vb are determined so as to satisfy 0.74<Va/Vb<0.84 in a case where the viscosity of ink to be discharged from the nozzle 18 is more than or equal to 10 cP and less than or equal to 14 cP.

By making the ratio Va/Vb higher than the lower limit of each of the above-described ranges, reduction in merging capability that would be caused by a low speed of ink to be discharged in response to the drive signal A is prevented while controlling the voltage Vb not to be excessively high. In other words, in a case of increasing the voltage Va while maintaining the ratio Va/Vb such that ink to be discharged in response to the drive signal A is discharged at a predetermined speed, a defect in which the voltage Vb becomes excessively high to deteriorate the pressure generator 17 is prevented from occurring.

By setting the ratio Va/Vb to be less than the upper limit of each of the above-described ranges, a defect in which ink on the tail end fails to catch up with preceding ink and fails to be merged is prevented from occurring. Therefore, by determining the voltage Va and the voltage Vb such that the ratio Va/Vb falls within the above-described ranges, ink is merged more reliably.

The drive signal A and the drive signal B include the expansion pulse signal for expanding the pressure chamber 19 and the contraction pulse signal to be applied subsequent to the expansion pulse signal to contract the pressure chamber 19, and the pulse width PWa of the expansion pulse signal in the drive signal A is set at more than or equal to AL and less than or equal to 1.4 AL. This adjusts a phase difference between pressure waves produced in the pressure chamber 19 respectively at the rising edge of the expansion pulse signal of the drive signal A and the falling edge of the contraction pulse signal, and controls a defect in which ink excessively spills out of the nozzle opening, so that blurring of ink is effectively reduced.

By setting the pulse width PWa of the expansion pulse signal in the drive signal A to be more than or equal to 1.2 AL and less than or equal to 1.4 AL, blurring of ink is reduced further.

The drive signal A and the drive signal B include the expansion pulse signal for expanding the pressure chamber 19 and the contraction pulse signal to be applied subsequent to the expansion pulse signal to contract the pressure chamber 19, and the pulse width PWa of the expansion pulse signal in the drive signal A is made different from AL. This adjusts a phase difference between pressure waves produced in the pressure chamber 19 respectively at the rising edge of the expansion pulse signal of the drive signal A and the falling edge of the contraction pulse signal, and controls a defect in which ink excessively spills out of the nozzle opening, so that blurring of ink is effectively reduced.

In a case where ½ of the acoustic resonance cycle of the pressure wave in the pressure chamber 19 is represented by AL, the composite drive signal is applied after a waiting time of more than or equal to 4 AL elapses after application of any other drive signal is terminated. This causes the pressure wave in the pressure chamber 19 to attenuate, and allows ink discharge to be started in a state where the meniscus is stable. Thus, reduction in merging capability that would be caused by blurring of ink or fluctuations in speed of ink is prevented.

The inkjet recording device 1 according to the present embodiment is the inkjet recording device 1 including the inkjet head 10 having the nozzle 18 that discharges ink and the pressure generator 17 that, in response to application of drive signals, provides pressure changes for ink in the pressure chamber 19 that communicates with the nozzle 18 to cause the ink to be discharged from the nozzle 18. A plurality of droplets of ink discharged from the nozzle 18 in response to application of a series of drive signals are caused to hit the recording medium M to form a single pixel. The inkjet recording device 1 includes the head driver 20 that applies a composite drive signal as the series of drive signals including the drive signal A in which a first voltage amplitude is the voltage Va and the drive signal B in which a second voltage amplitude is the voltage Vb higher than the voltage Va to the pressure generator 17. The last drive signal in the composite drive signal is the drive signal B. The voltage Va and the voltage Vb are determined such that the ratio Va/Vb has a value corresponding to the specific gravity of the ink to be discharged from the nozzle 18.

Such a configuration allows ink droplets discharged at the end in response to the drive signal B to fly at a speed of a desired value even in a case of discharging ink having a high specific gravity that is likely to spill out of the opening of the nozzle 18 and is likely to have a low discharge speed. This allows ink on the tail end to catch up with preceding ink to be merged appropriately. This effectively prevents reduction in image quality that would be caused by a failure in merging ink appropriately.

The inkjet recording device 1 according to the present embodiment is the inkjet recording device 1 including the inkjet head 10 having the nozzle 18 that discharges ink and the pressure generator 17 that, in response to application of drive signals, provides pressure changes for ink in the pressure chamber 19 that communicates with the nozzle 18 to cause the ink to be discharged from the nozzle 18. A plurality of droplets of ink discharged from the nozzle 18 in response to application of a series of drive signals are caused to hit the recording medium M to form a single pixel. The inkjet recording device 1 includes the head driver 20 that applies a composite drive signal as the series of drive signals including the drive signal A in which a first voltage amplitude is the voltage Va and the drive signal B in which a second voltage amplitude is the voltage Vb higher than the voltage Va to the pressure generator 17. The last drive signal in the composite drive signal is the drive signal B. The voltage Va and the voltage Vb are determined such that the ratio Va/Vb has a value corresponding to the viscosity of the ink to be discharged from the nozzle 18.

Such a configuration allows ink droplets discharged at the end in response to the drive signal B to fly at a speed of a desired value even in a case of discharging low-viscosity ink that is likely to spill out of the opening of the nozzle 18, and is likely to have a low discharge speed. This allows ink on the tail end to catch up with preceding ink to be merged appropriately. This effectively prevents reduction in image quality that would be caused by a failure in merging ink appropriately.

The present invention is not limited to the above-described embodiment, and can be modified variously.

For example, the composite drive signal may include three or more types of drive signals having voltage amplitudes different from one another, the voltage amplitudes being less than or equal to the voltage amplitude of the drive signal B. Also in this case, by setting the last drive signal in the composite drive signal to be the drive signal B, the speed of each ink is adjusted such that ink on the tail end catches up with preceding ink, so that ink is merged appropriately.

The waveforms of the drive signal A and the drive signal B are not limited to those illustrated in FIG. 7, and may be other driving waveforms that provide appropriate pressure changes for ink in the pressure chamber 19 to cause the ink to be discharged. For example, the rising edge and the falling edge of a voltage may be asymmetric, or a voltage change may not be a primary linear change. A combination of a pulse signal of a positive voltage and a pulse signal of a negative voltage or the like may be adopted. In this case, the voltage amplitudes of the pulse signal of a positive voltage and the pulse signal of a negative voltage should only be the voltage Va and the voltage Vb.

Some of the plurality of drive signals A included in the composite drive signal may be replaced by the drive signal B.

The above embodiment has been described using the inkjet head 10 in the shear mode as an example, but this is not for limitation purposes. For example, the present invention may be applied to a vent-mode inkjet head that deforms a piezoelectric element (pressure generator) fixed on a wall surface of a pressure chamber to fluctuate the pressure of ink in the pressure chamber, thereby causing ink to be discharged.

Besides, another pressure generator may be used which converts heat, electromagnetism, or the like into spatial deformation to provide pressure changes for ink in the pressure chamber.

The above embodiment has been described using the example of conveying the recording medium M with the conveyor 2 including the conveyor belt 2*c*, but this is not for limitation purposes. The conveyor 2 may be one that holds and conveys the recording medium M on the outer peripheral surface of a rotating conveyor drum, for example.

The above embodiment has been described using the inkjet recording device 1 of a single-path system as an example, but the present invention may be applied to an inkjet recording device that records an image while scanning with the inkjet head 10.

Some embodiments of the present invention have been described, whilst the scope of the present invention is not limited to the above-described embodiments, but includes the scope of the invention recited in claims and the scope of its equivalents.

INDUSTRIAL APPLICABILITY

The present invention is utilized for a method of driving an inkjet head, and an inkjet recording device.

REFERENCE SIGNS LIST

1 inkjet recording device
2 conveyor
2*a*, 2*b* conveyor roller
2*c* conveyor belt
3 head unit
10 inkjet head
11 channel substrate
12 cover plate
13 nozzle plate
14, 15 substrate
16 joint
17 pressure generator
18 nozzle
19 pressure chamber
20 head driver (driver)
21 driving waveform signal outputter
22 digital/analog converter
23 drive circuit
24 output selector
30 controller
31 CPU
32 RAM
33 storage
41 communicator
42 operation display
43 conveyance driver
44 temperature detector
45 bus
171 partition wall
172 electrode
A drive signal (first drive signal)
B drive signal (second drive signal)
M recording medium

The invention claimed is:

1. A method of driving an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel, the method comprising:

applying the series of the drive signals to the pressure generator, the series of the drive signals including a first one of the drive signals that has a first voltage amplitude and a second one of the drive signals that has a second voltage amplitude larger than the first voltage amplitude, wherein a last drive signal in the series of the drive signals is the second one of the drive signals, and the first voltage amplitude and the second voltage amplitude are determined such that a ratio Va/Vb has a value corresponding to a specific gravity of the ink to be discharged from the nozzle, where Va indicates the first voltage amplitude, and Vb indicates the second voltage amplitude;

wherein the first voltage amplitude and the second voltage amplitude are determined so as to satisfy $0.75<Va/Vb<0.86$ in a case where the specific gravity of the ink to be discharged from the nozzle is more than or equal to 1.0 g/cm$^3$ and less than or equal to 1.9 g/cm$^3$.

2. The method of driving according to claim 1, wherein the first voltage amplitude and the second voltage amplitude are determined such that the ratio Va/Vb decreases as the specific gravity of the ink to be discharged from the nozzle increases.

3. The method of driving according to claim 1, wherein the first voltage amplitude and the second voltage amplitude are determined so as to satisfy $0.76<Va/Vb<0.80$ in a case where the specific gravity of the ink to be discharged from the nozzle is more than or equal to 1.2 g/cm$^3$ and less than or equal to 1.4 g/cm$^3$.

4. The method of driving according to claim 1, wherein the drive signals include an expansion pulse signal that expands the pressure chamber and a contraction pulse signal to be applied subsequent to the expansion pulse signal to contract the pressure chamber, and a pulse width of the expansion pulse signal in the first one of the drive signals is more than or equal to AL and less than or equal to 1.4 AL, where AL indicates ½ of an acoustic resonance cycle of a pressure wave in the pressure chamber.

5. The method of driving according to claim 4, wherein the pulse width of the expansion pulse signal in the first one of the drive signals is more than or equal to 1.2 AL and less than or equal to 1.4 AL.

6. The method of driving according to claim 1, wherein the drive signals include an expansion pulse signal that expands the pressure chamber and a contraction pulse signal to be applied subsequent to the expansion pulse signal to contract the pressure chamber, and the pulse width of the expansion pulse signal in the first one of the drive signals is different from ½ of an acoustic resonance cycle of a pressure wave in the pressure chamber.

7. The method of driving according to claim 1, wherein the series of the drive signals are applied after a waiting time of more than or equal to 4 AL elapses after application of any other one of the drive signals is terminated, where AL indicates ½ of an acoustic resonance cycle of a pressure wave in the pressure chamber.

8. A method of driving an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel, the method comprising:

applying the series of the drive signals to the pressure generator, the series of the drive signals including a first one of the drive signals that has a first voltage amplitude and a second one of the drive signals that has a second voltage amplitude larger than the first voltage amplitude, wherein a last drive signal in the series of the drive signals is the second one of the drive signals, and the first voltage amplitude and the second voltage amplitude are determined such that a ratio Va/Vb has a value corresponding to a viscosity of the ink to be discharged from the nozzle, where Va indicates the first voltage amplitude, and Vb indicates the second voltage amplitude;

wherein the first voltage amplitude and the second voltage amplitude are determined so as to satisfy $0.60<Va/Vb<0.91$ in a case where the viscosity of the ink to be discharged from the nozzle is more than or equal to 8 cP and less than or equal to 16 cP.

9. The method of driving according to claim 8, wherein the first voltage amplitude and the second voltage amplitude are determined such that the ratio Va/Vb decreases as the viscosity of the ink to be discharged from the nozzle decreases.

10. The method of driving according to claim 8, wherein the first voltage amplitude and the second voltage amplitude are determined so as to satisfy $0.74<Va/Vb<0.84$ in a case where the viscosity of the ink to be discharged from the nozzle is more than or equal to 10 cP and less than or equal to 14 cP.

11. The method of driving according to claim 8, wherein the drive signals include an expansion pulse signal that expands the pressure chamber and a contraction pulse signal to be applied subsequent to the expansion pulse signal to contract the pressure chamber, and a pulse width of the expansion pulse signal in the first one of the drive signals is more than or equal to AL and less than or equal to 1.4 AL, where AL indicates ½ of an acoustic resonance cycle of a pressure wave in the pressure chamber.

12. The method of driving according to claim 11, wherein the pulse width of the expansion pulse signal in the first one of the drive signals is more than or equal to 1.2 AL and less than or equal to 1.4 AL.

13. The method of driving according to claim 8, wherein the drive signals include an expansion pulse signal that expands the pressure chamber and a contraction pulse signal to be applied subsequent to the expansion pulse signal to contract the pressure chamber, and the pulse width of the expansion pulse signal in the first one of the drive signals is different from ½ of an acoustic resonance cycle of a pressure wave in the pressure chamber.

14. The method of driving according to claim 8, wherein the series of the drive signals are applied after a waiting time of more than or equal to 4 AL elapses after application of any other one of the drive signals is terminated, where AL indicates ½ of an acoustic resonance cycle of a pressure wave in the pressure chamber.

15. An inkjet recording device including an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel, the inkjet recording device comprising:

a driver that applies the series of the drive signals to the pressure generator, the series of the drive signals including a first one of the drive signals that has a first voltage amplitude and a second one of the drive signals that has a second voltage amplitude larger than the first voltage amplitude, wherein a last drive signal in the series of the drive signals is the second one of the drive signals, and the first voltage amplitude and the second voltage amplitude are determined such that a ratio Va/Vb has a value corresponding to a specific gravity of the ink to be discharged from the nozzle, where Va indicates the first voltage amplitude, and Vb indicates the second voltage amplitude;

wherein the first voltage amplitude and the second voltage amplitude are determined so as to satisfy $0.75<Va/Vb<0.86$ in a case where the specific gravity of the ink to be discharged from the nozzle is more than or equal to 1.0 g/cm$^3$ and less than or equal to 1.9 g/cm$^3$.

16. An inkjet recording device including an inkjet head having a nozzle that discharges ink and a pressure generator that, in response to application of drive signals, provides pressure changes for ink in a pressure chamber that communicates with the nozzle to cause the ink to be discharged from the nozzle, a plurality of droplets of the ink discharged from the nozzle in response to application of a series of the drive signals being caused to hit a recording medium to form a single pixel, the inkjet recording device comprising:

a driver that applies the series of the drive signals to the pressure generator, the series of the drive signals including a first one of the drive signals that has a first voltage amplitude and a second one of the drive signals that has a second voltage amplitude larger than the first voltage amplitude, wherein a last drive signal in the series of the drive signals is the second one of the drive signals, and the first voltage amplitude and the second voltage amplitude are determined such that a ratio Va/Vb has a value corresponding to a viscosity of the ink to be discharged from the nozzle, where Va indicates the first voltage amplitude, and Vb indicates the second voltage amplitude;

wherein the first voltage amplitude and the second voltage amplitude are determined so as to satisfy $0.60<Va/Vb<0.91$ in a case where the viscosity of the ink to be discharged from the nozzle is more than or equal to 8 cP and less than or equal to 16 cP.

* * * * *